United States Patent
Nakamura (10) Patent No.: US 8,591,366 B2
(45) Date of Patent: Nov. 26, 2013

(54) AUTOMATIC TRANSMISSION DAMPER MECHANISM

(75) Inventor: Yoshikazu Nakamura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1067 days.

(21) Appl. No.: 12/594,209

(22) PCT Filed: Apr. 24, 2008

(86) PCT No.: PCT/IB2008/001010
§ 371 (c)(1),
(2), (4) Date: Oct. 1, 2009

(87) PCT Pub. No.: WO2008/132581
PCT Pub. Date: Nov. 6, 2008

(65) Prior Publication Data
US 2010/0048340 A1    Feb. 25, 2010

(30) Foreign Application Priority Data

Apr. 25, 2007   (JP) .................................. 2007-115041

(51) Int. Cl.
*F16H 31/00*   (2006.01)
(52) U.S. Cl.
USPC ............... 475/146; 475/116; 475/127; 90/31; 90/32; 90/33; 90/443
(58) Field of Classification Search
USPC .................. 475/116, 127, 146; 90/31–33, 443
See application file for complete search history.

(56) References Cited

U.S. PATENT DOCUMENTS

| | | | |
|---|---|---|---|
| 4,138,846 A | 2/1979 | Sakakibara | |
| 4,657,041 A | 4/1987 | Mitsui | |
| 5,941,358 A | 8/1999 | Hosseini et al. | |

FOREIGN PATENT DOCUMENTS

| | | | |
|---|---|---|---|
| JP | 61-059027 A | 3/1986 | |
| JP | 01-172666 A | 7/1989 | |
| JP | 03-234922 A | 10/1991 | |
| JP | 06-042636 A | 2/1994 | |
| JP | 10-096464 A | 4/1998 | |
| JP | 11-153214 A | 6/1999 | |
| JP | 11-241739 A | 9/1999 | |
| JP | 2004-324669 A | 11/2004 | |
| JP | 2005-036859 A | 2/2005 | |
| JP | 2005-249130 A | 9/2005 | |
| JP | 2007-064447 A | 3/2007 | |
| WO | 84/00794 A1 | 3/1984 | |

*Primary Examiner* — Derek D Knight
(74) *Attorney, Agent, or Firm* — Sughrue Mion, PLLC (57) ABSTRACT

An automatic transmission damper mechanism provided between a first hydraulic passage (23) to which an oil (L) is supplied and a second hydraulic passage (24) from which the oil (L) is supplied to a friction element (18) has: a container (8) provided between the first and second hydraulic passages (23, 24); a slide member (11) provided in the container (8) such that it can slide therein; and an elastic member (9) provided between an inner face of the container (8) and the slide member (11). The container (8) has a pressure chamber (28) defined by an inner face of the container (8) and the slide member (11) and communicating with a branch hydraulic passage (25) branching from the first hydraulic passage (23), and the slide member (11) has a communication hole (15) through which the first and second hydraulic passages (23, 24) are placed in communication by the elastic member (9) contracting under the pressure of the oil (L) supplied into the pressure chamber (28) through the branch hydraulic passage (25).

5 Claims, 8 Drawing Sheets

AUTOMATIC TRANSMISSION DAMPER MECHANISM

FIELD OF THE INVENTION

The invention relates to a damper mechanism for an automatic transmission used in a motor vehicle, and more particularly to such an automatic transmission damper mechanism that damps the pressure of the oil supplied to a friction element.

BACKGROUND OF THE INVENTION

Figure 6:
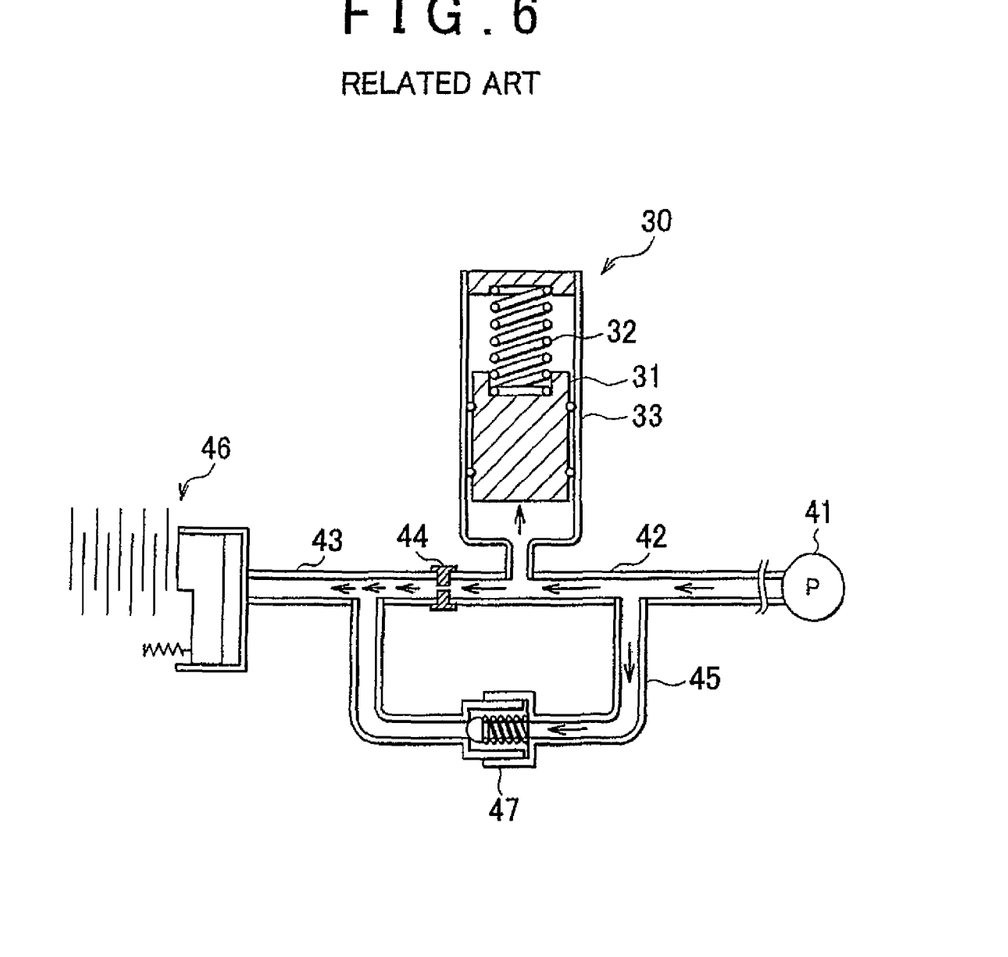
FIG. 6 is a cross-sectional view of an automatic transmission damper mechanism according to a related art.

In a known technology, in order to minimize a shift shock to the body of a vehicle which may be caused by a friction element (e.g., clutch or brake) in an automatic transmission of the vehicle being rapidly applied by the initial hydraulic pressure supplied thereto, an automatic transmission damper mechanism is used which includes an accumulator and an orifice both provided in a hydraulic passage dedicated to damping the hydraulic pressure (e.g., Refer to Japanese Patent Application Publication No. 11-153214 (JP-A-11-153214)). Further, FIG. 6 shows another known automatic transmission damper mechanism that has: a damper 30 constituted of a slide member 31, an elastic member 32, a container containing these members; a first hydraulic pipe 42 one end of which is connected to a pump 41 and the other end of which is connected to the damper 30; a second hydraulic pipe 43 one end of which is connected to the damper 30 and the other end of which is connected to a friction element 46, an orifice 44 provided between the first hydraulic pipe 42 and the second hydraulic pipe 43; a branch pipe 45 branching from the first hydraulic pipe 42 and extending to the second hydraulic pipe 43, and a check valve 47 provided midway in the branch pipe 43 so that the damper 30 and the check valve 47 are located in parallel.

According to the former related-art automatic transmission damper mechanisms, however, because the accumulator and the orifice are provided in the hydraulic passage as pressure damping elements, the following problems are concerned. That is, because the diameter of the orifice is not variable and it is provided in the hydraulic passage separately from the accumulator, the rising of the hydraulic pressure from the level at the beginning of the hydraulic pressure supply to the level required to apply the friction element is gentle, which may cause an operation response delay. Further, according to the above-described automatic transmission damper mechanisms, the damping function for absorbing hydraulic pressure overshooting is in effect until the hydraulic pressure supplied to the friction element reaches the level required to apply the friction element, and when the hydraulic pressure reaches the application level, the damping friction is cancelled. This feature requires another circuit means and another controller, which makes the system configuration further complicated. Likewise, in the related-art damper mechanism shown in FIG. 6, the fixed-diameter orifice 44 and the damper 30 are separately located in parallel. Therefore, the rising of the hydraulic pressure from the level at the beginning of the hydraulic pressure supply to the level required to apply the friction element is gentle, which may cause an operation delay.

DISCLOSURE OF THE INVENTION

The invention provides an automatic transmission damper mechanism that enables suppressing shift shocks of an automatic transmission which may occur upon shifting, or the like, while achieving a high response of the hydraulic pressure applied to a friction element, such as a clutch.

An aspect of the invention relates to an automatic transmission damper mechanism provided between a first hydraulic passage to which an oil is supplied and a second hydraulic passage from which the oil is supplied to a friction element and adapted to damp the pressure of the oil supplied to the first hydraulic passage and then supply the pressure-damped oil to the friction element via the second hydraulic passage. This automatic transmission damper mechanism has: a container provided between the first hydraulic passage and the second hydraulic passage; a slide member provided in the container such that it can slide therein; and an elastic member provided between the slide member and an inner face of the container. The container has a pressure chamber defined by the slide member and an inner face of the container and communicating with a branch hydraulic passage branching from the first hydraulic passage. The slide member has a communication hole through which the first hydraulic passage and the second hydraulic passage are placed in communication with each other by the elastic member contracting under the pressure of the oil supplied into the pressure chamber of the container through the branch hydraulic passage.

According to the automatic transmission damper mechanism described above, when no oil pressure is being supplied to the first hydraulic passage, the slide member is located on the lower side under the urging force of the elastic member. That is, at this time, the axis of the communication hole of the slide member is offset downward from the axis of the first hydraulic passage and from the axis of the second hydraulic passage, so that orifices are formed at the point of connection between the first hydraulic passage and the communication hole of the slide member and at the point of connection between the second hydraulic passage and the communication hole of the slide member, respectively. In this state, as the oil is supplied into the first hydraulic passage, the oil flows therefrom in different two flow paths, that is, to the communication hole of the slide member and to the branch hydraulic passage. The oil flowing to the communication hole of the slide member reaches the friction element through the aforementioned orifices and the second hydraulic passage, while the oil flowing to the branch hydraulic passage pushes the pressure-receiving face of the slide member. As the pressure-receiving face of the slide member is thus pushed, the slide member slides upward, whereby the elastic member contracts. Through the contraction of the elastic member, the thrust force of the oil is converted into an elastic energy, thereby damping the initial pressure of the oil in the first hydraulic passage. Subsequently, as the slide member further moves upward, the area of the oil passage at the point of connection between the first hydraulic passage and the communication hole of the slide member and the area of the oil passage at the point of connection between the second hydraulic passage and the communication hole of the slide member increase gradually, so that the first and second hydraulic passages are fully opened. Thus, the initial-pressure-damped oil smoothly flows from the first hydraulic passage to the second hydraulic passage through the communication hole of the slide member and reaches the friction element rapidly.

As such, in the automatic transmission damper mechanism described above, the first hydraulic passage and the second hydraulic passage serve as orifices for damping the initial hydraulic pressure and thus suppressing application shocks of the friction engagement due to the initial hydraulic pressure. After this, the first and second hydraulic passages are kept fully open, and therefore the oil flows rapidly through the communication hole of the slide member. As such, the hydraulic pressure shapely rises from the level at the beginning of the hydraulic pressure supply to the level required to apply the friction element, and thus the response of the hydraulic pressure improves accordingly. Accordingly, because the communication hole is formed in the slide member so as to serve as a variable orifice, it is not necessary to provide an orifice separately in the hydraulic passage. Further, because the communication hole of the slide member serves as a variable orifice, it is not necessary to provide a control circuit and a controller for controlling the initial hydraulic pressure. According to the invention, thus, shift shocks which may occur due to the initial hydraulic pressure upon shifting of the automatic transmission can be suppressed effectively.

The above-described automatic transmission damper mechanism may be such that the cross-sectional area of the communication hole of the slide member is larger than the cross-sectional area of the first hydraulic passage and the cross-sectional area of the second hydraulic passage. This structure ensures, owing to the cross sectional area of the communication hole being lager than those of the first and second hydraulic passage, that the first and second hydraulic passages are more reliably placed in the fully open state when the slide member moves upward by the pressure-receiving face being pushed by a given pressure.

Further, the elastic member may be made of a material the elasticity modulus of which varies in accordance with the temperature of the oil. This material may be a shape-memory alloy. Further, the material may be such that the elasticity modulus of the material equals a first elastic modulus when the temperature of the oil is higher than a predetermined temperature and equals a second elastic modulus that is smaller than the first elastic modulus when the temperature of the oil is equal to or lower than the predetermined temperature. When the temperature of the oil is low and thus the viscosity of the oil is high, the flow speed of the oil in each respective hydraulic passage becomes lower than normal and thus the fluidity of the oil decreases accordingly. However, even in such a case, if the elastic member is made of a shape-memory material the elasticity modulus of which varies in accordance with the temperature of the oil, a sufficient deformability of the elastic member and thus a sufficient hydraulic pressure response can be obtained. For example, in order to ensure that the elastic member properly deforms under the thrust force of the hydraulic pressure, the elastic member may be formed such that the spring constant k of the elastic member is large when the temperature of the oil is high and it is small when the temperature of the oil is equal to or lower than the room temperature. Thus, the response to the hydraulic pressure can be made as high as it is when the temperature of the oil is equal to or higher than the room temperature.

As described above, the automatic transmission damper mechanism suppresses, with a simple structure, a shift shock which may occur upon shifting of the automatic transmission due to the initial hydraulic pressure while achieving a high response of the hydraulic pressure to a friction element, such as a clutch.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

In the following, an example embodiment of the invention will be described with reference to the accompanying drawings.

FIG. 1 to FIG. 5 are views each showing an automatic transmission damper mechanism according to an example embodiment of the invention. First, referring to the cross-sectional view of FIG. 1, the automatic transmission damper mechanism 1 of this example embodiment is constituted of a damper 2, a first hydraulic passage member 3, a second hydraulic passage member 4, a hydraulic branch passage member 5, a damper hydraulic passage member 6, and a check valve 7.

Figure 1:
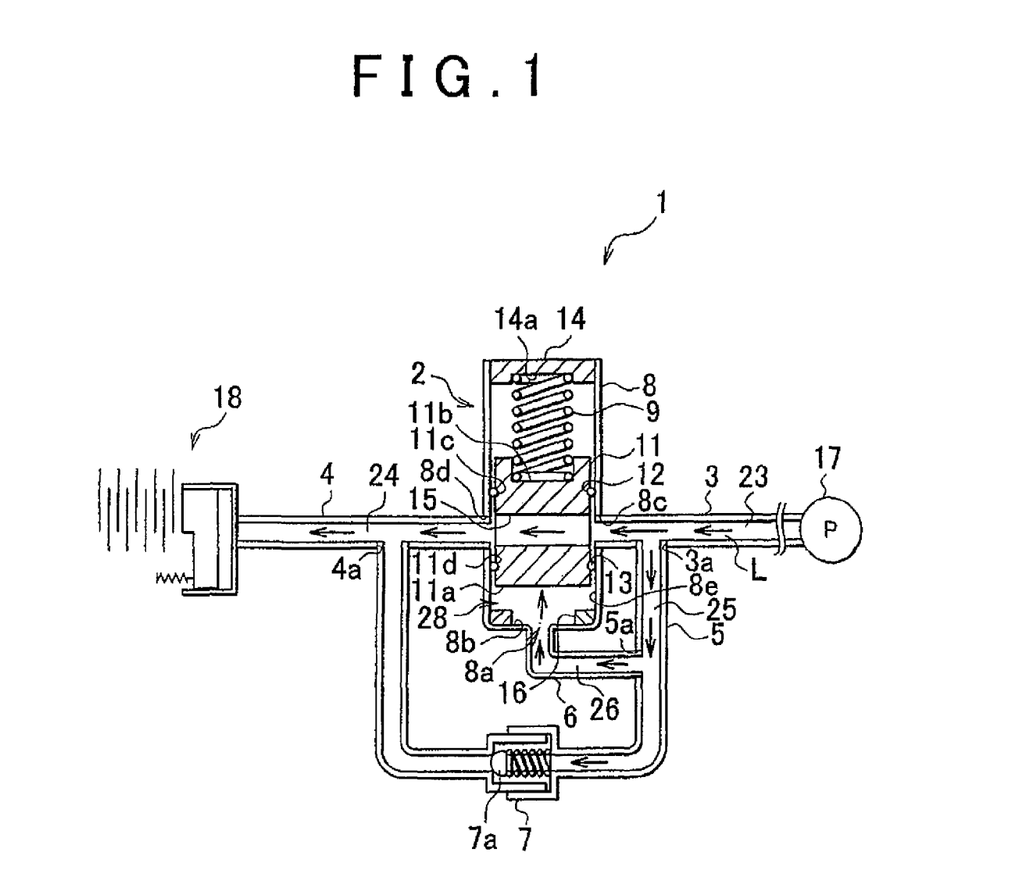
FIG. 1 is a cross-sectional view of an automatic transmission damper mechanism according to an example embodiment of the invention, which shows how the hydraulic oil flows when a friction element is being applied.

The damper 2 is constituted of a container 8, an elastic member 9 provided in the container 2, a slide member 11 engaging with the elastic member 9, and oil seals 12, 13 attached on the slide member 11. One side face of the damper 2 is connected to one end of the first hydraulic passage member 3 while the other side face of the damper 2, which is opposite to the former side face, is connected to one end of the second hydraulic passage member 4.

A container 8, which is a cylindrical case having a bottom, contains an elastic member 9 and the slide member 11. A lid 14 is attached on the upper side of the container 8 where an opening is formed. A concave portion 14a is formed on the backside of the lid 14, and one end of the elastic member 9 is supported by the concave portion 14a of the lid 14. An oil inlet 8a is provided at the bottom of the container 8 so that oil L flows into the container 8 through the oil inlet 8a. One end of the damper hydraulic passage member 6 is inserted into the oil inlet 8a of the container 8, whereby the bottom of the container 8 and the end of the damper hydraulic passage member 6 are connected.

Formed around the oil inlet 8a in the container 8 is a stopper 16 that blocks the slide member 11 so that it does not slide downward beyond the stopper 16. A through hole 8c is formed in a side wall of the container 8, and one end of the first hydraulic passage member 3 is inserted into the through hole 8c. A through hole 8d is formed in a side wall of the container 8 that is opposite the side wall in which the through hole 8c is formed. The through hole 8d and the through hole 8c are coaxial with each other. One end of the second hydraulic passage member 4 is inserted into the through hole 8d.

The elastic member 9 is a coil spring made from a wire rod made of an elastic material (e.g., plastic) and having a circular cross section. This coil spring is adapted to contract by distance $\sigma$ (mm) under load F (N). That is, the elastic member 9 is formed so as to have a spring constant k (N/mm) expressed by $k=F/\sigma$. One end of the elastic member 9 engages with the concave portion 14a while the other end engages with the upper end portion of the slide member 11, whereby the slide member 11 is urged downward by urging force Fs. Note that the elastic material for the elastic member 9 may be a given spring material.

The slide member 11 is made of metal, plastic, etc. and formed in the shape of a round column. The slide member 11 is adapted to slide up and down in the container 8. A concave portion 11b is formed in the top face of the slide member 11, and the lower end of the elastic member 9 is supported by the concave portion 11b.

A pressure-receiving face 11a for receiving the pressure of the oil L, which is hydraulic fluid (ATF), or the like, is formed on the bottom of the slide member 11. The pressure-receiving face 11a is a flat face perpendicular to the axis of the slide member 11. A communication hole 15 is formed in the slide member 11. The communication hole 15 penetrates the slide member 11 in the direction perpendicular to the axial direction of the slide member 11. The oil L flows from the first hydraulic passage member 3 to the second hydraulic passage member 4 via the communication hole 15. The inner face of the communication hole 15 is processed to have an uniform smoothness so that the oil L can smoothly flow therein. The diameter $D_1$ of the communication hole 15 is set based on the vehicle model and some conditions related to the hydraulic circuit of the automatic transmission. Seal attachment grooves 11c and 11d are formed in the outer peripheral face of the slide member 11, and the oil seals 12, 13 are fit in these grooves 11c, 11d, respectively.

The oil seals 12, 13 are made of an elastic material (e.g., silicon rubber), for example, the oils seals 12, 13 are O-rings. The oils seals 12, 13 slide together with the slide member 11 in the container 8, whereby the oil L is prevented from leaking to the communication hole 15 and to the upper side of the container 8.

As such, a pressure chamber 28 is defined by the pressure-receiving face 11a of the slide member 11, a bottom face 8b and an inner side face 8e of the container 8, and the oil L flows into the pressure chamber 28 via the oil inlet 8a and is stored therein.

The first hydraulic passage member 3 is a cylindrical pipe. Within the first hydraulic passage member 3 is formed a first hydraulic passage 23 one end of which communicates with an oil outlet of an oil pump 17, which is not shown in the drawings, and the other end of which communicates with the through hole 8c of the container 8. The oil pump 17 is connected to the engine and is driven by the rotation of the engine. The oil pump 17 is adapted to pump up the oil in an oil pan provided in the automatic transmission via an oil strainer and send it to a friction element 18 as a lubricant and to a hydraulic circuit constituted of valve bodies, and so on, as a hydraulic oil. The friction element 18 is a coupling device that applies using friction (e.g., a clutch or a brake). For example, assuming that the friction element 18 is a clutch, as oil is supplied into the clutch via an oil inlet of the clutch, the thrust force of the supplied oil acts on the pressure-receiving face of the clutch piston, whereby the clutch piston moves. As the clutch piston thus moves, a driven plate of the clutch frictionally engages with a drive plate, whereby the drive force of the engine is transmitted to the output shaft of the automatic transmission. The first hydraulic passage member 3 has a through hole 3a, and one end of the hydraulic branch passage member 5 is inserted into the through hole 3a.

Figure 2A:
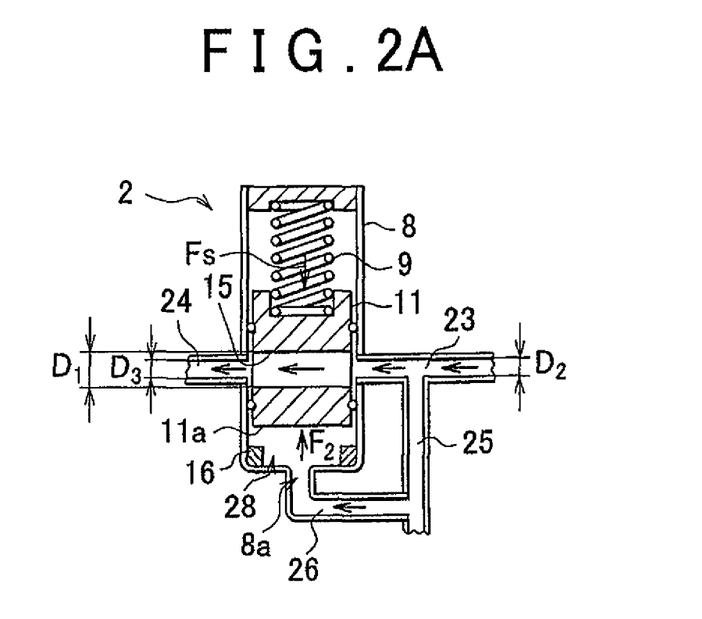
FIG. 2A is a cross-sectional view of the main portion of the automatic transmission damper mechanism of the example embodiment of the invention, which shows the state where the first hydraulic passage and the second hydraulic passage fully communicate with each other via a communication hole of a slide member.
Figure 2B:
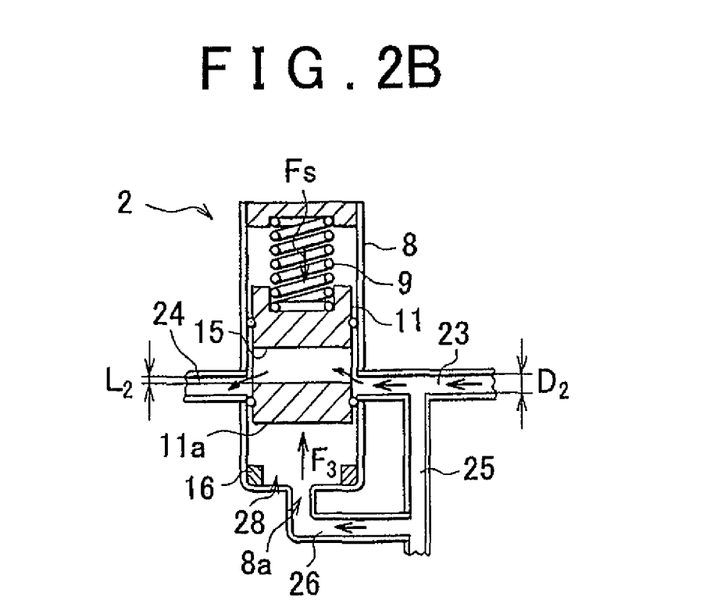
FIG. 2B is a cross-sectional view of the main portion of the automatic transmission damper mechanism of the example embodiment of the invention, which shows the state where the first hydraulic passage and the second hydraulic passage partially communicate with each other via the lower side of the communication hole of the slide member.
Figure 2C:
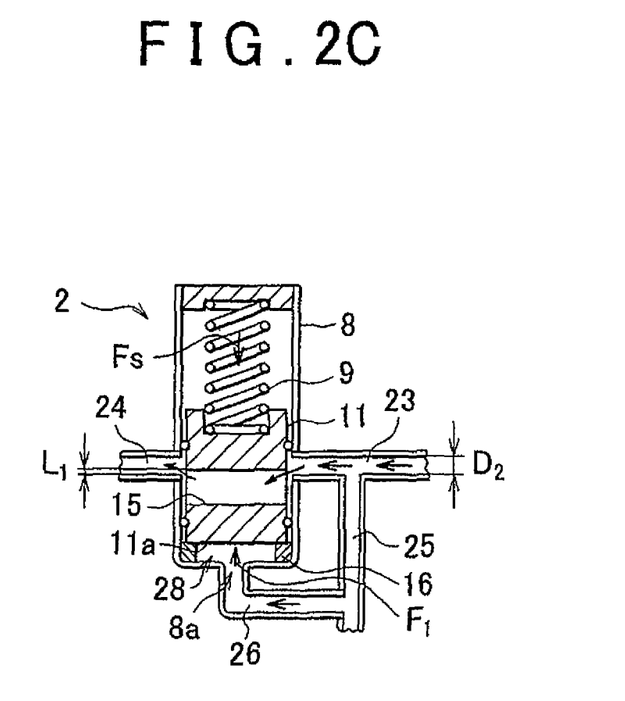
FIG. 2C is a cross-sectional view of the main portion of the automatic transmission damper mechanism of the example embodiment of the invention, which shows the state where the first hydraulic passage and the second hydraulic passage partially communicate with each other via the upper side of the communication hole of the slide member.

Referring to FIG. 2A to FIG. 2C, the first hydraulic passage 23 has a diameter $D_2$, and the oil L supplied from the oil pump 17 is delivered to the communication hole 15 via the first hydraulic passage 23 and to the oil inlet 8a of the container 8 via the hydraulic branch passage member 5. The diameter $D_2$ of the first hydraulic passage 23 is set based on the vehicle model and some conditions related to the hydraulic circuit.

The second hydraulic passage member 4 is a cylindrical pipe. Within the second hydraulic passage member 4 is formed a second hydraulic passage 24 the one end of which communicates with the through hole 8d of the container 8 and the other end of which communicates with the oil inlet of the friction element 18, which is not shown in the drawings. The second hydraulic passage member 4 has a through hole 4a, and one end of the hydraulic branch passage member 5 is inserted into the through hole 4a. As shown in FIG. 2A, the second hydraulic passage 24 has a diameter $D_3$. Thus, the flow rate of the oil L is adjusted through the pressure damping at the damper 2, and then it is supplied to the oil inlet of the friction element 18, which is not shown in the drawings, via the second hydraulic passage 24. The diameter $D_3$ of the second hydraulic passage 24 is equal to the diameter $D_2$ of the first hydraulic passage 23, so that the oil L smoothly flows from the first hydraulic passage 23 to the second hydraulic passage 24 via the communication hole 15 when the slide member 11 is at such a position that the axis of the first hydraulic passage 23, the axis of the second hydraulic passage 24, and the axis of the communication hole 15 are aligned. Note that in this example embodiment the diameter $D_1$ of the communication hole 15 is larger than the diameter $D_2$ of the first hydraulic passage 23 and the diameter $D_3$ of the second hydraulic passage 24. That is, the cross-sectional area of the communication hole 15 is larger than the cross-sectional area of the first hydraulic passage 23 and the cross-sectional area of the second hydraulic passage 24.

The hydraulic branch passage member 5 is a cylindrical pipe. Within the hydraulic branch passage member 5 is formed a branch hydraulic passage 25 one end of which communicates with the through hole 3a of the first hydraulic passage member 3 and the other end of which communicates with the through hole 4a of the second hydraulic passage member 4. The hydraulic branch passage member 5 has a through hole 5a. One end of the damper hydraulic passage member 6 is inserted into the through hole 5a. The check valve 7 is provided midway in the hydraulic branch passage member 5 such that a check ball 7a is located on the second hydraulic passage member 4 side. The check valve 7 allows the flow of the oil L from the second hydraulic passage member 4 to the first hydraulic passage member 3 and interrupts the flow of the oil L from the first hydraulic passage member 3 to the second hydraulic passage member 4.

The damper hydraulic passage member 6 is a cylindrical pipe. Within the damper hydraulic passage member 6 is formed a damper hydraulic passage 26 one end of which communicates with the through hole 5a of the hydraulic branch passage member 5 and the other end of which communicates with the oil inlet 8a of the container 8.

In the following, the operation of the automatic transmission damper mechanism 1 of this example embodiment of the invention will be described. First, as the oil pump 17 is activated, the oil L is supplied to the first hydraulic passage 23 via given circuit switching portions and flow-rate adjusting portions, which are not shown in the drawings. At this time, as shown in FIG. 2C, the pressure-receiving face 11a of the slide member 11 is in contact with the stopper 16, and the elastic member 9 is in the most expanded state. In this case, therefore, the axis of the communication hole 15 is offset downward from the axis of the first hydraulic passage 23 and from the axis of the second hydraulic passage 24. More specifically, only an interval $L_1$ serves as the passage for the oil L. In other words, an orifice having the interval $L_1$ is created. In this state, the oil L is guided from the first hydraulic passage 23 both to the communication hole 15 and to the branch hydraulic passage 25.

The oil L that has been guided toward the communication hole 15 enters the communication hole 15 via a gap of the interval $L_1$ and then enters the second hydraulic passage 24 via the gap of the interval $L_1$, so that the oil L is supplied to the friction element 18. As such, the gap of the interval $L_1$ serves as an orifice for damping the initial hydraulic pressure and thus suppressing shift shocks caused by the initial hydraulic pressure. On the other hand, the oil L that has been guided to the branch hydraulic passage 25 proceeds in the branch hydraulic passage 25 and the damper hydraulic passage 26 and then enters the pressure chamber 28 via the oil inlet 8a.

After entering the pressure chamber 28, the oil L pushes the pressure-receiving face 11a of the slide member 11 by pressure $F_1$, thus contracting the elastic member 9 engaged with the slide member 11. When the amount the elastic member 9 contracts under the pressure $F_1$ from the most expanded position is cal, $\sigma_1$, $\sigma_1 = F_1/k$ is obtained from the expression (1), $k = F/\sigma$. Thus, the slide member 11 moves upward by σ1. As such, the pressure $F_1$ is converted into an elastic energy through the contraction of the elastic member 9, whereby the pressure decreases accordingly. That is, the initial pressure of the oil L in the first hydraulic passage 23 is absorbed by the damper 2, whereby the shift shocks caused by the initial hydraulic pressure are further suppressed.

Then, as shown in FIG. 2A, the slide member 11 further moves upward under pressure $F_2$ of the oil L against urging force $F_S$ of the elastic member 9 and then stops and remains substantially stationary at a position where the axis of the communication hole 15 is aligned with the axis of the first hydraulic passage 23 and the axis of the second hydraulic passage 24, that is, at a position where the pressure $F_2$ and the urging force $F_S$ are in equilibrium, whereby the communication hole 15 is fully open. As such, the damper 2 serves as a variable orifice. That is, the oil L smoothly flows from the first hydraulic passage 23 to the second hydraulic passage 24 via the communication hole 15 and then reaches the friction element 18. In this state, even if the pressure of the oil L pulsates, that is, even if the pressure $F_2$ of the oil L in the pressure chamber 28 changes, the pressure change is absorbed by the elastic member 9 contracting or expanding via the slide member 11. As such, the damper 2 serves as a damper for adjusting pulsating pressures.

If the pressure $F_2$ of the oil L in the pressure chamber 28 increases to pressure F3 when the slide member 11 is at the position where the axis of the communication hole 15 is aligned with the axis of the first hydraulic passage 23 and the axis of the second hydraulic passage 24, that is, when the slide member 11 is at the position indicated in FIG. 2A, the slide member 11 further moves upward as shown in FIG. 2B. More specifically, when the amount the elastic member 9 contracts under the pressure $F_3$ from the most expanded position is $\sigma_3$, $\sigma_3 = F3/k$ is obtained from the expression (1), $k = F/\sigma$. Thus, the slide member 11 moves upward by $\sigma_3$.

As the slide member 11 further moves upward, the axis of the communication hole 15 is offset upward from the axis of the first hydraulic passage 23 and from the axis of the second hydraulic passage 24, and therefore only an interval $L_2$ is present as the passage for the oil L, in other words, an orifice of the interval $L_2$ is created. As a result, the flow rate of the oil L flowing through the communication hole 15 is limited and thus the hydraulic pressure supplied to the friction element 18 is limited such that it does not become excessive. Thus, the hydraulic pressure continues to be appropriately supplied to the friction element 18.

Figure 3:
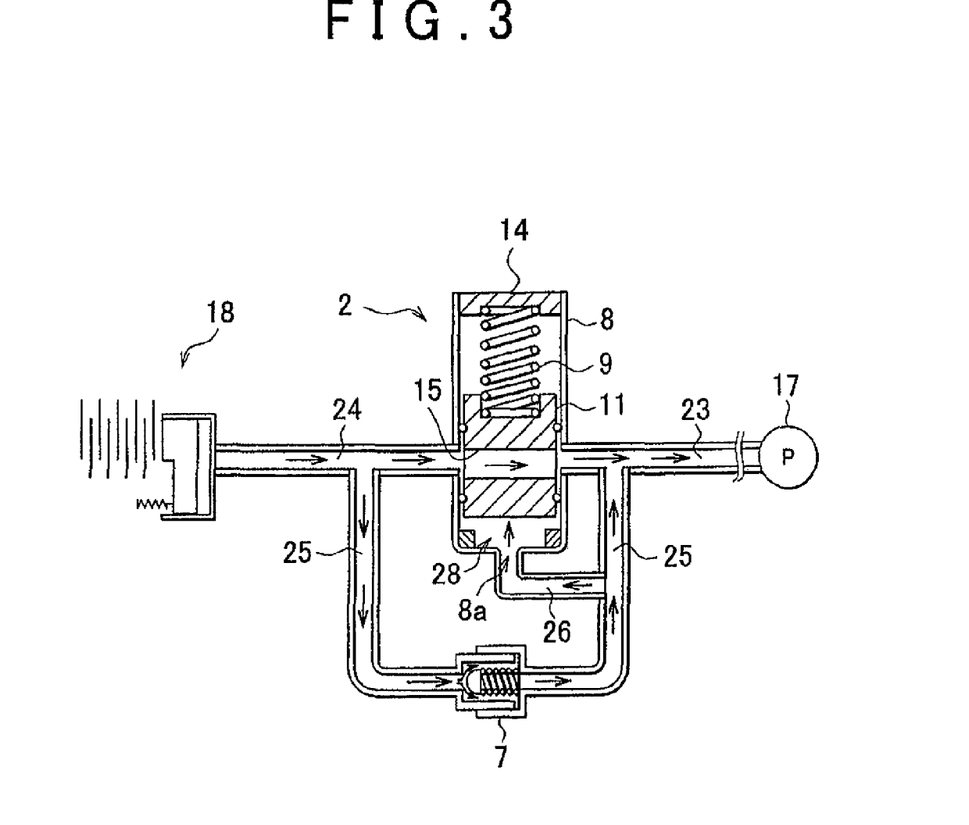
FIG. 3 is a cross-sectional view of the automatic transmission damper mechanism of the example embodiment of the invention, which shows how the hydraulic oil flows when the friction element is being released.

Meanwhile, when the friction element 18 is released, as shown in FIG. 3, the oil L flows from the friction element 18 toward the damper 2, as opposed to when the friction element 18 is applied, and enters both the communication hole 15 and the branch hydraulic passage 25. More specifically, at this time, the oil L enters the first hydraulic passage 23 via the second hydraulic passage 24 and the communication hole 15 on one side and via the branch hydraulic passage 25 and the check valve 7 on the other side. During this time, the oil L in the branch hydraulic passage 25 proceeds in the damper hydraulic passage 26 and enters the pressure chamber 28 via the oil inlet 8a, and the pressure of the oil L acts on the pressure-receiving face 11a of the slide member 11, pressing the slide member 11 upward. As a result, the slide member 11 is kept at the position where the communication hole 15 is fully open with the axis of the communication hole 15 being aligned with the axis of the first hydraulic passage 23 and the axis of the second hydraulic passage 24. In this state, therefore, the oil L flows straight from the second hydraulic passage 24 to the first hydraulic passage 23 via the communication hole 15 and straight from the second hydraulic passage 24 to the first hydraulic passage 23 via the branch hydraulic passage 25. As such, when the friction element 18 is released, the releasing operation of the friction element 18 can be made quick, and therefore the shift response of the vehicle improves significantly.

Figure 4:
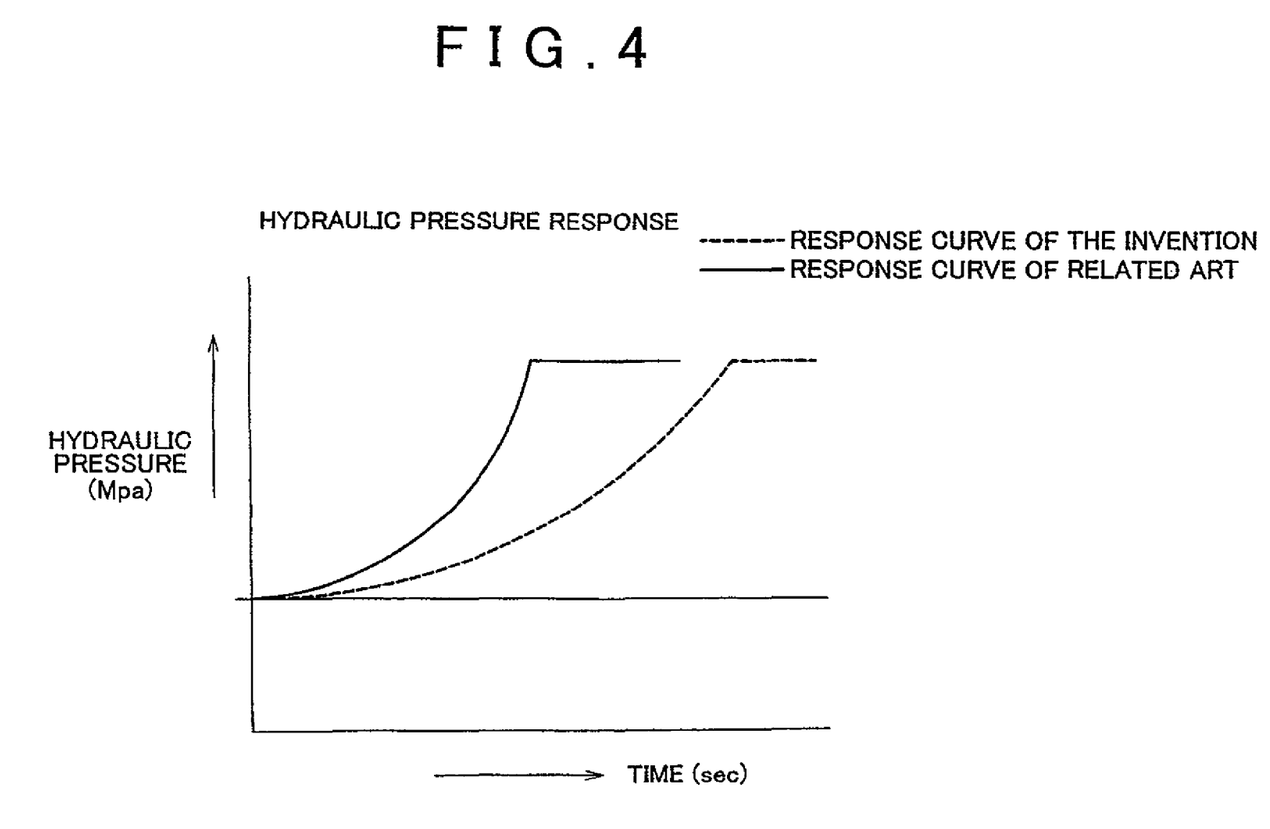
FIG. 4 is a graph in which the relation between the hydraulic pressure and the time from when the hydraulic pressure starts to be supplied to when the hydraulic pressure reaches the level required to apply the friction element is indicated by response curves.
Figure 5A:
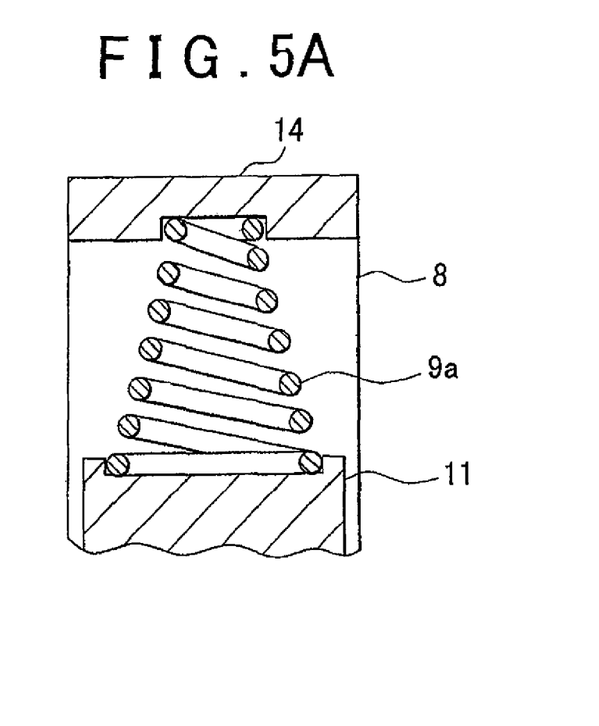
FIG. 5A is a cross-sectional view of a conical coil spring used as an elastic member for the automatic transmission damper mechanism of the example embodiment of the invention.
Figure 5B:
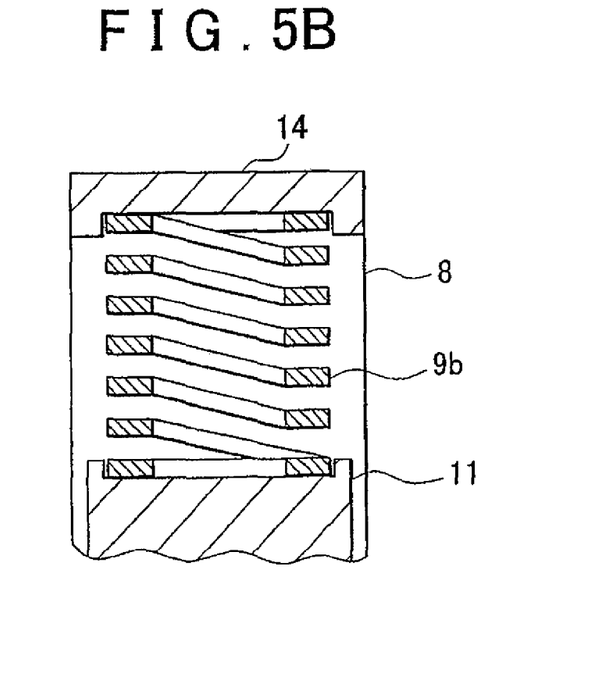
FIG. 5B is a cross-sectional view of a coil spring made from a wire rod having a square cross section, which is used as an elastic member for the automatic transmission damper mechanism of the example embodiment of the invention.
Figure 5C:
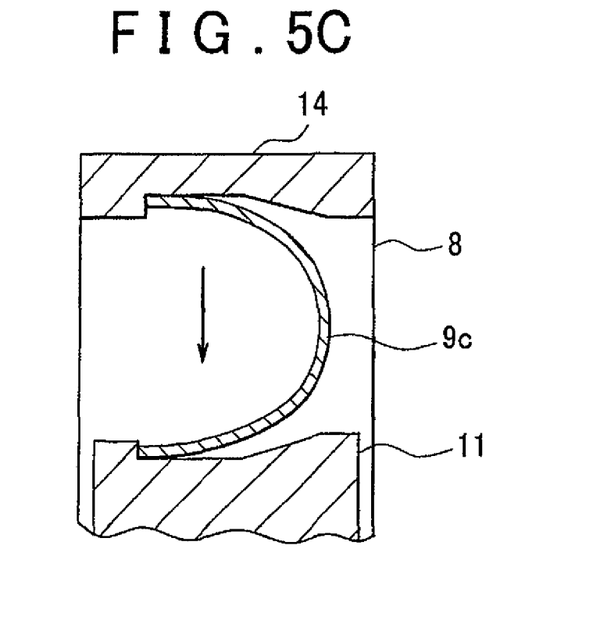
FIG. 5C is a cross-sectional view of an arc-shaped leaf spring used as an elastic member for the automatic transmission damper mechanism of the example embodiment of the invention.
Figure 5D:
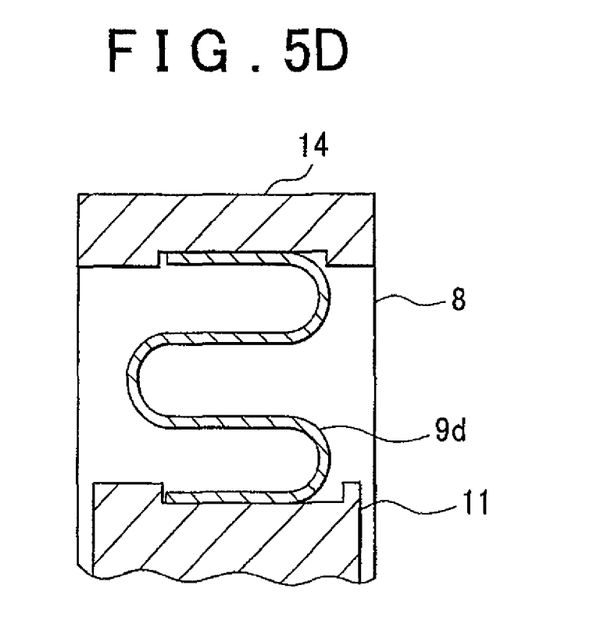
FIG. 5D is a cross-sectional view of an M-shaped leaf spring used as an elastic member for the automatic transmission damper mechanism of the example embodiment of the invention.

As described above, the automatic transmission damper mechanism 1 of this example embodiment of the invention serves as a damper for adjusting the pressure of the oil L supplied to the first hydraulic passage 23 and as a variable orifice for adjusting the flow rate of the oil L flowing from the first hydraulic passage 23 to the second hydraulic passage 24. As such, as compared to related-art damper mechanisms, the response characteristic of the hydraulic pressure supplied to the friction element improves significantly. The graph of FIG. 4 shows response curves each representing the relation between the hydraulic pressure and the time from when the hydraulic pressure starts to be supplied to when the hydraulic pressure reaches the level required to apply the friction element. The horizontal axis of the graph indicates time (sec), while the vertical axis indicates the hydraulic pressure (Mpa) applied to the friction element. The dotted curve is the response curve representing said relation obtained with a related-art automatic transmission damper mechanism, while the solid curve is the response curve representing said relation obtained with the automatic transmission damper mechanism 1 of the example embodiment of the invention.

According to the related-art automatic transmission damper mechanism, a damper mechanism and a fixed-diameter orifice are separately provided, therefore the rising of the hydraulic pressure from the level at the beginning of the hydraulic pressure supply to the level required to apply the friction element is relatively gentle. On the other hand, according to the automatic transmission damper mechanism 1 of the invention, because the damper mechanism and the variable orifice are integrated as described above, the initial hydraulic pressure is damped and the communication hole 15 is fully opened and thus the oil L flows straight through the communication hole 15. As such, as shown in FIG. 4, the rising of the hydraulic pressure from the level at the beginning of the hydraulic pressure supply to the level required to apply the friction element 18 is sharp. That is, the automatic transmission damper mechanism 1 of the example embodiment of the invention is capable of suppressing shift shocks of the automatic transmission while improving the shift response of the automatic transmission significantly.

While the elastic member 9 is a single cylindrical coil spring made from a wire rod having a circular cross section as shown in FIG. 1, the elastic member 9 may alternatively be constituted of two or more identical or different springs or may be formed in a non-cylindrical shape. For example, the elastic member 9 may be a conical coil spring 9a made from a wire rod having a circular cross section, such as the one shown in FIG. 5A, a coil spring 9b made from a wire rod having a square cross section, such as the one shown in FIG. 5B, an arc-shaped leaf spring 9c made from a plate member, such as the one shown in FIG. 5C, or a M-shaped leaf spring 9d made from a plate member, such as the one shown in FIG. 5D.

Further, the elastic member 9 may be made of an elastic material the elasticity modulus of which varies according to the temperature of the oil L. For example, the elastic member 9 may be made of an elastic material the elastic modulus of which equals a given value when the temperature of the oil L is higher than a predetermined temperature and equals a value lower than the given value when the temperature of the oil L is equal to or lower than the predetermined temperature.

Further, in order to accomplish a variable elasticity modulus of the elastic member 9, the elastic member 9 may be a coil spring made of a shape-memory alloy, or the like. For example, the coil spring may be made of a shape-memory alloy composed of Ti (titanium) and Ni (nickel) (Ti—Ni alloy). When producing a coil spring from a shape-memory alloy, for example, the transformation temperature at which a phase transformation for changing the crystal structure occurs is set to a room temperature, so that the spring constant k is small in the martensite phase at a low temperature of 20° C. or lower and the spring constant k is large in the austenite phase (parent phase) at a high temperature of 40° C. or higher. In this case, when the temperature of the oil L is equal to or lower than the room temperature and the viscosity of the oil L is therefore relatively high, the spring constant k of the elastic member 9 becomes small so that it can easily deform under the thrust force of the hydraulic pressure. As such, even if the temperature of the oil L is low, the response to the hydraulic pressure can be made as high as it is when the temperature of the oil L is equal to or higher than the room temperature. Note that other than shape-memory alloys, any material may used as long as it has the characteristic described above. For example, the elastic member 9 may be made of a resin having the characteristic described above.

Further, in this example embodiment, as shown in FIG. 1, the first hydraulic passage member 3, the second hydraulic passage member 4, the hydraulic branch passage member 5, and the damper hydraulic passage member 6 are all cylindrical pipes. However, they may be formed otherwise. For example, the first hydraulic passage member 3, the second hydraulic passage member 4, the hydraulic branch passage member 5, and the damper hydraulic passage member 6 may be provided as portions of a valve body. That is, in this case, the first hydraulic passage 23, the second hydraulic passage 4, the branch hydraulic passage 25, and the damper hydraulic passage 26 are formed in a valve body and the damper 2 is coupled with the side face of the valve body.

Further, in the foregoing example embodiment of the invention, the through hole 8c and the through hole 8d are formed in the respective side walls of the container 8 so as to be coaxial with each other as shown in FIG. 1 to FIG. 3. The through hole 8c and the through hole 8d may alternatively be formed in the respective side walls of the container 8 such that the axis of the through hole 8c and the axis of the through hole 8d are parallel to each other at a given interval. In this case, for example, the communication hole 15 is obliquely formed in the slide member 11 such that one end of the communication hole 15 is connected to the first hydraulic passage 23 and the other end of the communication hole 15 is connected to the second hydraulic passage 24 to fully open the first hydraulic passage 23 and the second hydraulic passage 24 at the same time and thus to enable the oil L to flow smoothly from the first hydraulic passage 23 to the second hydraulic passage 24 via the communication hole 15.

As described above, the automatic transmission damper mechanism 1 is provided between the first hydraulic passage 23 to which the oil L is supplied and the second hydraulic passage 24 from which the oil L is supplied to the friction element 18 so as to damp the pressure of the oil L supplied to the first hydraulic passage 23 and then deliver the pressure-damped oil L to the friction element 18 via the second hydraulic passage 24; the automatic transmission damper mechanism 1 has the container 8 provided between the first hydraulic passage 23 and the second hydraulic passage 24, the slide member 11 contained in the container 8 such that it can slide therein, and the elastic member 9 provided between the slide member 11 and the container 8; and the container 8 has the pressure chamber 28 defined by the inner faces of the container 8 and the slide member 11 and communicating with the branch hydraulic passage 25 branching from the first hydraulic passage 23; and the slide member 11 has the communication hole 15 that places the first hydraulic passage 23 and the second hydraulic passage 24 in communication as the slide member 11 slides by the elastic member 9 contracting under the pressure of the oil L supplied into the pressure chamber 28 via the branch hydraulic passage 25. As such, the invention provides damper mechanisms that can suppress shift shocks that may occur due to the initial hydraulic pressure upon shifting of the automatic transmission while achieving a high response of the hydraulic pressure supplied to a friction element, such as a clutch. Thus, damper mechanisms according to the invention can be effectively used in various shifting means for automatic transmissions and in various control circuits using hydraulic pressures.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. An automatic transmission damper mechanism provided between a first hydraulic passage to which an oil is supplied and a second hydraulic passage from which the oil is supplied to a friction element and adapted to damp a pressure of the oil supplied to the first hydraulic passage and then supply the pressure-damped oil to the friction element via the second hydraulic passage, comprising:
   a container provided between the first hydraulic passage and the second hydraulic passage;
   a slide member provided in the container such that it can slide therein;
   an elastic member provided between the slide member and an inner face of the container,
   a pressure chamber defined in the container by the slide member and another inner face of the container and communicating with a branch hydraulic passage branching from the first hydraulic passage;
   a communication hole which is formed in the slide member and through which the first hydraulic passage and the second hydraulic passage are placed in communication with each other by the elastic member contracting under the pressure of the oil supplied into the pressure chamber of the container through the branch hydraulic passage and
   the slide member having the communication hole is configured so that an axis of the communication hole is offset downward from an axis of the first hydraulic passage and from an axis of the second hydraulic passage when the elastic member is in the most expanded state, and when the oil is supplied to the first hydraulic passage when the elastic member is in the most expanded state, the oil is guided from the first hydraulic passage to both the communication hole and the branch hydraulic passage, and the oil that is guided to the branch hydraulic passage is supplied to the pressure chamber of the container.

2. The automatic transmission damper mechanism according to claim 1, wherein
   a cross-sectional area of the communication hole of the slide member is larger than a cross-sectional area of the first hydraulic passage and a cross-sectional area of the second hydraulic passage.

3. The automatic transmission damper mechanism according claim 1, wherein
   the elastic member is made of a material having an elasticity modulus which varies in accordance with a temperature of the oil.

4. The automatic transmission damper mechanism according to claim 3, wherein
   the material is a shape-memory alloy.

5. The automatic transmission damper mechanism according to claim 3, wherein
   the elasticity modulus of the material equals a first elastic modulus when the temperature of the oil is higher than a predetermined temperature and equals a second elastic modulus that is smaller than the first elastic modulus when the temperature of the oil is equal to or lower than the predetermined temperature.

* * * * *